(12) United States Patent
Ditsche

(10) Patent No.: US 11,286,974 B2
(45) Date of Patent: Mar. 29, 2022

(54) SUCTION DEVICE FOR REVERSIBLE ADHESION TO A SUBSTRATE SURFACE

(71) Applicant: Petra Ditsche, Hennef (DE)

(72) Inventor: Petra Ditsche, Hennef (DE)

( * ) Notice: Subject to any disclaimer, the term of this patent is extended or adjusted under 35 U.S.C. 154(b) by 0 days.

(21) Appl. No.: 17/156,675

(22) Filed: Jan. 25, 2021

(65) Prior Publication Data
US 2021/0231163 A1    Jul. 29, 2021

(30) Foreign Application Priority Data

Jan. 27, 2020  (DE) .......................... 102020101870.3
Jan. 27, 2020  (DE) .......................... 202020100421.2
Jan. 21, 2021  (DE) .......................... 202021100297.2

(51) Int. Cl.
*F16B 47/00*    (2006.01)
*B66C 1/02*    (2006.01)
*F16M 13/02*    (2006.01)

(52) U.S. Cl.
CPC ............ *F16B 47/00* (2013.01); *B66C 1/0212* (2013.01); *F16M 13/022* (2013.01); *F16B 2200/00* (2018.08)

(58) Field of Classification Search
CPC .... F16B 47/00; F16B 2200/00; B66C 1/0212; F16M 13/022
(Continued)

(56) References Cited

U.S. PATENT DOCUMENTS 6,143,391 A    11/2000  Barnes
8,783,634 B2    7/2014  Summers
(Continued)

FOREIGN PATENT DOCUMENTS

DE    102006020032 A1    10/2007
WO    9719272 A1    5/1997
(Continued)

OTHER PUBLICATIONS

Durometer Shore Hardness Scale. In: Internet Archive: Wayback Machine, editing status Apr. 14, 2019 URL:https://web.archive.org/web/20190414004716/https://www.smooth-on.com/page/durometer-shore-hardness-scale/ —downloaded by German Patent Office dated Oct. 2, 2020, cited there in an Office Action.
(Continued)

*Primary Examiner* — Muhammad Ijaz
(74) *Attorney, Agent, or Firm* — Michael Soderman

(57) ABSTRACT

A suction device, in particular a suction cup, suction lifter, or vacuum gripper, for reversible attachment to a substrate surface, comprising a first component, which is used for the actuation of the suction device, and a second component, which can be brought into contact with the substrate surface via the suction cup surface, wherein the first component consists of at least one harder first material and the second component of at least one, in comparison to the first material, softer second material, wherein the second material is an extremely soft material with a Shore 00 hardness less than 50, wherein the thickness of the second component measures, in an unloaded condition, at least 2.5% of an outer diameter or a length or a width of the first component and/or particles and/or fibers, which are harder than the second material, are integrated into at least one second material.

15 Claims, 8 Drawing Sheets

(58) Field of Classification Search
USPC ...... 248/467, 683, 537, 205.5, 205.8, 206.2,
248/206.3, 309.3, 362, 363
See application file for complete search history.

(56) References Cited

U.S. PATENT DOCUMENTS

| | | | |
|---|---|---|---|
| 9,488,214 B2 | 11/2016 | Orban | |
| 9,499,214 B2 | 11/2016 | Agius | |
| 2008/0217493 A1* | 9/2008 | Bevirt | F16M 13/022 248/163.1 |
| 2008/0224009 A1* | 9/2008 | Song | F16B 47/003 248/309.3 |
| 2012/0112023 A1* | 5/2012 | Tollman | F16B 47/006 248/205.7 |
| 2016/0258471 A1* | 9/2016 | Orban | F16B 47/00 |
| 2016/0331163 A1* | 11/2016 | Handerhan | A47G 19/10 |
| 2020/0256376 A1* | 8/2020 | Chang | F16B 47/00 |

FOREIGN PATENT DOCUMENTS

| | | | |
|---|---|---|---|
| WO | 1997019272 A1 | 5/1997 | |
| WO | 2013055111 A1 | 4/2013 | |

OTHER PUBLICATIONS

Shore Hardness Scale. In: Internet Archive: Wayback Machine, editing status Sep. 29, 2019 URL: https://web.archive.org/web/20190929004542/http://www.americule.com/products/aim-impact-material/formulations/ downloaded by German Patent Office dated Oct. 2, 2020, cited there in an Office Action.

\* cited by examiner

SUCTION DEVICE FOR REVERSIBLE ADHESION TO A SUBSTRATE SURFACE

CROSS REFERENCE TO RELATED APPLICATIONS

This application claims the priority of DE 102020101870.3 filed on 2020 Jan. 27, the priority of DE 202020100421.2 filed on 2020 Jan. 27 and the priority of DE 202021100297.2 filed on 2021 Jan. 21; all applications are incorporated by reference herein in their entirety.

BACKGROUND

The present invention relates, in accordance with the first claim, to a suction device, in particular a suction cup, a suction lifter, or a vacuum gripper, for reversible attachment to a substrate surface.

On non-porous surfaces, suction cups provide an excellent possibility to reversibly attach items without damaging the surface. With this, they occupy a different market niche than mechanical attachment devices such as screws, nails, cramps, or glues, which are preferably designed for permanent attachment and usually damage the items and/or surfaces (residuals of glue, holes, pressure marks, etc.).

Underwater the situation is even more difficult, as underwater adhesives are still in development for many applications and usually are difficult to apply. Moreover, the biofilm cover impairs attachment, as it causes an additional surface structure and often makes the surface slippery.

In contrast, systems for temporary attachment such as duct tape and suction cups enable reversible attachment without damaging the surface. However, in comparison to suction cups, duct tape holds only items of comparably low weight. In contrast, suitable, high-quality suction cups can hold items of higher weight (several kg). Conventional technical suction cups normally require a surface that is smooth (or with just very small surface irregularities) and flat (or just slightly bent) in order to function.

In U.S. Pat. No. 6,143,391 A, a one-piece suction device made out of two materials is described that incorporates an inner part and an outer part permanently connected to that inner part. The inner and the outer parts are made out of two different materials, in which the properties of the inner material are chosen to be of comparably higher conformity, compliance, and softness. Attachment to slightly rough surfaces, such as painted walls, may be achieved.

Patent WO 1997019272 A1 (see also DE 696 10 216 T2 out of the same patent family) reveals a releasable mounting device, which includes a sticky resilient material or a sheet-like resilient layer or a gasket and a suction cup, which interacts with the resilient layer. In order to support the resistance to movement in the direction parallel to the surface, there are, at the flattened suction cup, namely when applying it to a flat surface, heightened annuli embedded in the resilient layer, which are directly formed on the suction cup part. An individual adaptation to high surface roughness is not possible. The resilient layer has a durometer rating of less than or equal to 30 Shore A to less than or equal to 10 Shore A. Moreover, the resilient layer is made out of a sticky material, which leaves oil residuals after detachment. When the suction cup is attached to a flat surface, the heightened annuli cause resistance to radial movement inside and outside. This suction cup provides attachment to somewhat rough, at least non-smooth surfaces. An individual adjustment to coarse surface roughness, waviness, and coarse shape deviation, which correspond to shape deviations of order 1-3 in accordance with DIN 2760, are not possible.

Patent WO 2013055111 A1 relates to a vacuum extractor consisting of a support cap, made of a hard synthetic resin, a suction cup, comprising a coating layer, injection coated with an elastomer on the upper surface and the circumferential lateral side of a plate for adsorption, and an adsorption layer injection molded with an elastomer having a hardness lower than that of the coating layer in an overlapped manner on the circumferential lateral side and a part of the coating layer including the lower surface of the plate for adsorption, in which the suction disc is elastically deformed as to be closely adhered to a surface to be suctioned.

In U.S. Pat. No. 9,499,214 B2 an armature-based suction device is described, which comprises in direction to the substrate surface an annular band of a soft, resilient, sticky, solid, and non-flowable material located on an annular recess, wherein the annular band has a stickiness producing a 90° peel strength of about 0.1 to 40 lb./in. The annular band has a hardness between 35 Shore 000 and 50 Shore A. Since the stickiness of the annular band is essential for the function of this suction device, particularly if surface irregularities are present, this suction cup does not function on wet or submerged surfaces.

Patent DE 10 2006 020 032 A1 describes a mechanism to increase the ability to attach suction cups and low-pressure devices, in which the rim is sealed to the substrate surface by an added, glued, injected, or molded region of an extremely soft material with a Shore A hardness of 5 and less. The sealing element is thereby developed as an O-ring, rests on a recess of the suction plate, and reaches in the radial direction over the suction plate so that a pressure cap can act on the protruding gasket element. Through the gasket cap protrudes a shaft, which is formed with the suction plate and connected with a handle. While turning the handle down, the suction plate is raised in its middle and the pressure cap presses on its peripheral side on the gasket element. A lower pressure forms between a substrate surface and the suction area, causing the suction device to attach to the substrate surface. Thus, the gasket element is fixed between the limit stop of the suction plate and the rim of the pressure plate acting from above, the region in which the gasket element acts against the substrate surface is reduced to a relatively narrow range, and the gasket element cannot deform freely in the radial inner or outer direction. Moreover, the stiff pressure plate can only press the soft gasket element onto a flat surface with a superimposed roughness (without presence of additional waviness or coarse shape deviation); an adaptation to surfaces with several superimposed shape deviations of different orders such as surfaces with waviness and additional surface roughness is not possible.

The above presented solutions enable improved sealing on slightly structured substrates. Attachment to non-flat or strongly-structured surfaces, such as metal ridge stock, or surfaces with shape deviation over several orders in accordance to DIN 2760 (coarse shape deviation, waviness, different roughness orders) cannot be ensured with these suction devices. Moreover, these solutions were usually developed for non-wet surfaces.

Inspiration for attachment to not only slightly rough, but considerably rough and/or wavy or bent surfaces comes from nature, the Northern Clingfish, a small fish that is able to attach to extremely rough stones in the intertidal region by means of its suction cup.

Building up on these insights, patent U.S. Pat. No. 8,783,634 A1 describes a suction device having the ability to attach to rough surfaces, along with methods for attaching the suction device to a target surface. The suction device includes a body having a suction area and a plurality of micro-rods depending from margins of the suction area that provide sufficient friction as well as sealing to rough surfaces. Through implementation it was shown, however, that it is difficult to produce suction cups with said micro-rods in the required size dimension and low hardness in a cost-effective way.

SUMMARY

The invention relates to a suction device, in particular a suction cup (1), suction lifter, or vacuum gripper (1V), for reversible attachment to a substrate surface (2), comprising a first component (3), which is used for the actuation of the suction device, and a second component (4), which can be brought into contact with the substrate surface (2) via the suction cup surface (5), wherein the first component (3) consists of at least one harder first material and the second component (4) of at least one, in comparison to the first material, softer second material, wherein the second material is an extremely soft material with a Shore 00 hardness less than 50, wherein the thickness (d2) of the second component measures, in an unloaded condition, at least 2.5% of an outer diameter (D1) or a length (L) or a width (B) of the first component (3) and/or particles (6) and/or fibers, which are harder than the second material, are integrated into at least one second material. The presented suction cup can be applied on very rough and wavy surfaces as well as underwater.

DETAILED DESCRIPTION

The task of the invention presented here is to provide a suction device, in particular a suction cup, suction lifter, or vacuum gripper, which enables reliable attachment to substrate surfaces with coarse roughness, wavy and/or bent surfaces on dry, wet, or submerged underwater substrate surfaces. The suction device concerns notably a suction cup or vacuum gripper. In specific cases the suction cup may also be located in a suction lifter. (In the following the latter case is included under suction cup if not specifically mentioned in another way.)

This task is solved with the first claim.

Beneficial embodiments result from the dependent claims.

The suction device for reversible attachment to a substrate surface according to the present invention, in particular the suction cup, suction lifter, or vacuum gripper, comprises a first component, which conducts the actuation of the suction device, and a second component, which may bring the suction cup surface (this term is used for the suction cup, the suction lifter, and the vacuum gripper) into contact with the substrate surface, wherein the first component contains at least one harder and elastic first material and the second component contains at least one, in comparison to the first component, softer second material, wherein the second material is an extremely soft material with a Shore 00 hardness less than or equal to 50, wherein:
  the thickness of the second component, in an unloaded condition, is at least 2.5% of an outer diameter or a length or a width of the first component and/or
  at least one second material of the second component contains particles and/or fibers, which are harder than the second material.

Wherein the second, extremely soft component, which reaches inward from the circumferential margin of the first component and points toward the substrate surface, comprises preferably at least 55% of the first component's total area.

In particular, the said second component preferably reaches over at least 65% and especially preferably over 75% of the total suction cup area.

The hardness of the said second component may also have a Shore 00 hardness of 10 or less.

Moreover, the first material of the first component preferably has a Shore A hardness of at least 50 and especially preferably greater than or equal to 60. This ensures the required elastic deformation of the suction cup from an unloaded to a loaded condition and reverse.

Preferably the material of the second component has a thickness of 3% to 8% and especially preferably of 3.5% to 7% of the outer diameter or length or width of the first component.

The extremely soft material of the second component resembles the function of the hierarchical structures of the soft and extremely compliant region of the Northern clingfish's suction cup. In contrast, the first component resembles the underlying bone structures ensuring the stability.

The denoted Shore hardness herein is preferably the Shore hardness at room temperature, in particular at 23° C.

Preferably the second component has a larger thickness than the first component.

The thickness of the second component, in an unloaded condition of the suction device, should be more than 2.5%, preferably 3% to 8%, and especially preferably 3.5% to 7% of the longest dimension reaching in the plane of the substrate surface (depending on the design the outer diameter or a length or a width, depending on whether the first component is designed circumferentially or angularly).

Wherein the thickness of the second component is adjusted based on the size of the suction device (the suction cup, suction lifter or vacuum gripper). The bigger the diameter or the length/width of the first component of the suction device, the thicker the second component is designed. This particularly relates to the thickness of the second component, attached under a loaded condition to the substrate surface.

Actuating the suction device (the suction cup, suction lifter, or vacuum gripper) creates a lower pressure in comparison to the ambient pressure between the suction device and the substrate surface. After placing the suction cup on the substrate surface, the lower pressure may be created by pressing the second component onto the substrate surface or, in the case of a suction lifter, by lifting the second component. In both cases a lower pressure in comparison to the ambient is created in the cavity between the substrate surface and the inner chamber of the suction cup, and the suction cup may be loaded with a force in relation to the substrate.

By using an extremely soft, highly elastic material for the second component, advantageously, a better adaptation to the irregularities of the substrate surface is reached.

It has been shown to be especially beneficial that the first material has a Shore A hardness of at least 50 and preferably greater than or equal to 60.

For attaching to rough, but non-bent, substrates, the hardness of the said first component can also be considerably higher, for example a Shore A hardness of 80 to 100 or more where applicable.

In the case of a suction cup, it is always important that the first component is elastic enough that it is able to recover its original unloaded shape.

Preferably the elasticity of the first component is chosen in such a way that a certain compliance, and therefore the possibility to adjust to bent substrate surfaces, is ensured. In contrast to stiff structures, such as pressure caps and the like, this ensures the ability to adapt to shape deviations over several orders (coarse shape deviations, waviness, various roughness orders).

Simultaneously it is necessary that the first component is designed sufficiently stiff in order to ensure an optimal force transmission to the second component. The first material should be stiff enough both to ensure force transmission while attaching the suction cup to the substrate surface and to transfer a force acting in the direction opposite the displacement of the substrate surface (elastic or restoring force which generates the suction effect/lower pressure). In suction cups, which shall be applied on rough but non-bent substrate surfaces, the first component could also have a considerably higher elasticity and hardness.

For industrial applications, for example a vacuum gripper, the first component may also be made out of a less elastic material or even metal or another firm, not or less elastic material and be much thinner in comparison to the second component.

The softer and thicker the second component, the better it can be attached to rough or uneven and/or bent substrate surfaces.

The suction cup of the Northern clingfish has an unusually broad margin, which is beneficial for sealing to extremely rough surfaces. In the biomimetic implementation it has also shown to be beneficial for the application on rough to extremely rough surfaces if the second component covers a large part of the suction cup surface. In comparison to O-ring-shaped, gasket-like, elastic material layers, this improves the sealing, since not only small but also coarser surface structures may be covered and enclosed by the extremely soft second component.

Thereby the extremely soft material should not be limited in its radial or horizontal movability by inner or outer stops or stiff structures on the carrier, since this would limit the adaptability to coarser surface structures and roughness and shape variations of different orders.

Preferably the second component has a larger diameter than the first component. With the enlarged area, an optimal sealing between the substrate surface and the second component of the suction cup or vacuum gripper is advantageously ensured, since the material of the second component can adapt well to the substrate surface.

The first component and the second component may also have an equal or nearly equal outer diameter.

The substrate surface may be formed at a substrate, e.g. an arbitrary item or an element or a biological structure.

Ideally, both the first and the second component extend over the whole area of the suction cup.

It is also possible that the first component extends over the whole area of the suction cup, while the second component extends only over a wide area of the margin of the first component. In the area between the said margin and the middle of the suction cup, the second component may be partly perforated.

The perforation of the second component is particularly required in vacuum grippers.

If the second component only extends over a wide margin, it needs to extend at least over the area in which the attachment to the underlying substrate surface shall be ensured. This preferable extension of the contact surface improves the sealing on strongly structured surfaces.

Thereby an extension of not less than 55% of the total area, particularly not less than 65%, and ideally more than 75% of the suction cup surface has been shown to be suitable or beneficial.

Moreover, it is possible that the second component extends over the surface of the suction cup and that the first component has one or more perforations over the area or the diameter or the radius of the first component. That way the first component may be star-shaped, grid-shaped, or any arbitrary design that ensures force transmission to the second component.

In a preferred embodiment of the invention, the second component has a thickness, over the whole area or parts of the area, of at least 1 mm to 5 mm, preferably greater than or equal to 1.5 mm, and especially preferably greater than or equal to 2.5 mm to 3 mm.

The ideal, absolute thickness of the second component depends on the size of the suction cup; it is preferably 3% to 8%, and especially preferably 3.5% to 7%, of the diameter or length or width of the first component of the suction cup in an unloaded condition.

Therefore, in some embodiments the thickness of the second component may be less than 1 mm.

Increasing the thickness of the second component increases the tolerable degree of surface irregularities that the target surface may possess while ensuring a secure and durable attachment of the suction device (particularly the suction cup, the suction lifter, and the vacuum gripper) to the substrate surface. Investigations have shown that suction cups with a smaller thickness of the second component (less than or equal to 2.5%) cannot attach well to very rough surfaces (roughness or surface structure greater than or equal to 1 mm).

Moreover, the ability to attach to bent surfaces increases with the thickness of the second component as well as with the diameter of the suction cup and the elasticity of the first component.

Preferably at least one material of the second component consists of at least one polymer and/or at least one elastomer or a combination of one or more polymers and/or elastomers. Wherein for example silicone, thermoplastic elastomers, rubber, natural rubber, or silicone may be considered. Silicone and/or elastomers are used preferably. In one embodiment, for example, the second component is made out of platinum-catalyzed silicone.

For the functional capability of the second component, it is nonessential whether it is sticky or not. Preferably the material of the second component has a low tackiness (peel strength less than 45.5 g/in).

The first material particularly consists of an elastic synthetic material, e.g. a thermoplastic elastomer, rubber, natural rubber, or silicone.

There is the possibility that the applied material or the material combination changes throughout the area of the suction cup, particularly from outside to inside.

Besides the desired improved sealing on very rough surfaces, the extreme softness of the second component, particularly in combination with its large thickness, may cause earlier slipping of the suction cup in the contact region to the substrate surface. This would cause a reduced attachment force in both the vertical and the horizontal directions. To counter this, several embodiments have been designed to increase the friction properties. Inspiration came again from the Northern clingfish, whose hierarchical structures on the extremely compliant suction cup margin lead to improved friction properties. However, the improvement of the friction properties has been solved in a different way in this invention.

In a preferred embodiment, particles and/or fibers, which are harder or much harder than the second material, are integrated into at least one second material of the second component.

Alternatively or in addition, columns or column-like structures with a circular or polygonal cross-section may be embedded in the second component and are made of an elastic but stiffer material than the material of the second component.

The said columns or column-like structures preferably have a hexagonal cross-section and are arranged like honeycombs, and consist of a somewhat harder material (less than or equal to a Shore A hardness of 70 and preferably a Shore A hardness of 5 to 30). They are preferably embedded in the extremely soft material of the second component. This structure increases both the stability and the friction properties of the second component while, similar to the honeycomb-like arranged papillae of the clingfish's suction cup, simultaneously ensuring an extremely well adaptation to the coarse surface irregularities (shape deviations of lower orders). The extremely soft, column-embedding material enables the columns to moderately adapt to the substrate while simultaneously ensuring sealing to the sides and substrate surface and moreover prevents the columns from sticking to each other.

Additionally, the extremely soft material, which covers the said hexagonal columns, may contain harder particles or fibers to further improve the friction properties of the second component.

Advantageously, such particles and/or fibers and/or columns or column-like structures improve the friction properties of the suction cup in relation to the substrate surface.

This causes among others a resistance of the suction cup margin against slipping inward while the suction device (in particular the suction cup or vacuum gripper) is pulled in the vertical direction to the substrate surface, to which the suction cup attaches. This leads to higher attachment forces of the suction device (in particular the suction cup, the suction lifter, or the vacuum gripper). The improved friction properties enhance not only the normal forces acting perpendicularly to the substrate surfaces but also the shear forces, which resist the detachment forces applied in parallel to the substrate surface. In the latter case, the whole suction cup/suction device (particularly the area attached to the substrate surface) is pulled parallel to the substrate surface.

It has been shown to be particularly beneficial when the particles and/or fibers and/or columns or column-like structures are integrated into at least one second material in such a way that, if a force is applied from the suction cup surface to the substrate surface, the suction cup surface and the particles are pressed toward the substrate surface and into the irregular profile of the substrate surface and/or are at least partly forced into the indentations of the roughness profile of the substrate surface.

In an unloaded condition, the surface of the second component, which comes into contact with the substrate surface, is preferably totally smooth and consequentially has almost no structure. The suction cup surface is ideally almost as smooth as glass with a smooth surface (preferably <1 μm roughness). Advantageously, increasing friction retains the sealing of the suction cup on smooth and rough substrate surfaces. Given that the material of the second component is extremely soft, a slight roughness of the suction cup surface is tolerable.

In an attached suction device, if a contact pressure is applied toward the substrate surface, the particles and/or fibers within the second component are pressed toward the substrate surface. That way they can adapt to a bent contour and/or a roughness profile of the substrate surface. Consequently, the friction increasement only functions while contact pressure is exerted. The contact pressure is generated at the margin of the suction cup by the restoring force of the first component of the suction cup. However, the region of the suction cup, which is in contact with the substrate surface, may be very wide.

Moreover, there may be structures originating from the first component that reach into the second component and, while contact pressure is exerted, press into the second layer. These structures, for example, are designed as regularly or irregularly distributed point-shaped structures or radiate from the center to the outside. The size and shape of the structures may be aligned with the surface structure of the substrate in order to optimize the friction.

Such said structure, originating from the first component and reaching into the second component, has essentially the same function as the particles in the second component, which, when contact pressure is exerted, are pressed into the substrate surface, particularly into the valleys of the surface structure, thereby increasing friction.

If the suction device is a suction cup, it is important that the upper part of the suction cup, namely the first component, has a high restoring force and therefore develops sufficient contact pressure.

If the suction cup is part of a suction lifter, then the lower pressure may alternatively be generated by mechanically lifting the first component. Some suction lifters may be equipped with a vacuum pump, which is manually operated and by which lower pressure can be generated.

The second component of the suction device advantageously possesses particles and/or fibers of a harder material. In an attached suction device, while the second component is under contact pressure, the particles/fibers press onto or into the substrate surface. This increases friction between the second component and the substrate surface and thereby increases the attachment force of the total suction device, in the form of a suction cup, a suction lifter, or a vacuum gripper, so that it can hold a higher weight.

In the case of a vacuum gripper, the pressure may be generated by a vacuum (by means of a vacuum pump) instead of a restoring force of the first component. The particles used may be particles in the conventional meaning and/or fibers, fiber fragments, or planar formations.

Especially preferably hard or very hard particles and/or fibers made of glass, stone (basalt), sand, ceramic, metal, resin, corundum, or diamond particles and the like are used, separately or in combination.

Whereby, for rougher surfaces preferably larger particles are used, and for substrate surfaces with a lower roughness preferably smaller particles are used. The particles and/or fibers preferably have a diameter of 40% to 70% of the size of the indentations in the roughness profile of the substrate surface. In particular, the particles have a diameter of 60% of the interspaces of the target surface.

Good results can usually be reached with particles between 10 μm and 200 μm in diameter. Fibers with a thickness of 5 μm to 30 μm and a length of 0.1 mm to 1 mm are also applicable on most surfaces. Only microspheres or only fibers or combinations of various sizes and shapes are applicable, for example, on substrates with a large range of grain sizes and roughness depth or on substrates with unknown surfaces.

If the substrate surface is known, by means of knowing the specific application for example, then the most suitable material configuration for this application may be determined through pretests with different materials of the first component and/or second component and/or particles/fibers. Along with the particle size, the particle shape may be adjusted to the specific substrate surface, and various particle shapes and/or sizes may be included in the second component.

In specific embodiments, the second component is releasably attached to the first component. Thereby, the second component, which in some embodiments may be worn more quickly, may be produced separately and exchanged as required. Moreover, an individual adjustment of the second component to different substrate surfaces is possible.

The second component may also be glued to the first component and/or attached to the first component by vacuum. Moreover, a mechanical connection, for example by interlocking connecting elements, is conceivable.

Alternatively, it is possible to design the suction device (the suction cup or vacuum gripper) in one piece or to connect the second component permanently with the first component.

The suction device (the suction cup or vacuum gripper) may be manufactured, for example, by using 3D printing, molding, or two-component injection molding. Moreover, the second component may be injection molded to the first component. Alternatively, the first component and the second component are separately manufactured and are subsequently detachably or non-detachably connected to each other.

Moreover, a combination of the said procedures is possible.

The suction device (the suction cup or vacuum gripper) preferably has a diameter of about 20 mm to 25 cm. However, depending on the application considerably smaller or larger dimensions are conceivable.

Thereby, the diameter of the suction device (the suction cup or vacuum gripper) should also be adjusted to the shape and size of the substrate or the connected object.

In a preferred embodiment of the invention, at least one second material is a swellable material and/or contains swellable particles, and/or the second component is coated with a swellable material.

Advantageously, small gaps between the suction cup or vacuum gripper and the substrate surface may be closed by the swellable material. Thereby, the sealing can be improved, for example, in long-term applications on challenging surfaces underwater (e.g. in bodies of water, ponds, swimming pools) or in wet environments (e.g. in moisture-prone areas). A suitable swellable material is for example hydrogel. Swellable products may be based on rubber and acrylic polymers as well as other swellable materials.

The suction cup preferably possesses a grip or connection element and/or, if applied as a vacuum gripper, a vacuum connection to the vacuum pump so that a vacuum can be generated between the suction cup surface and the target surface.

The grip or connection element and/or the vacuum connection for a vacuum pump are preferably located at the first component and especially preferably at the side of the first component that is opposite the second component.

The grip or connection element assists the connection of objects to the suction cup. The grip or connection element may possess one or more screw threads, hooks, loops, or other suitable connection elements, or it may itself be formed as a hook, a loop, or similar.

If a connection to a vacuum pump is planned, the suction cup may be used as a gripper/vacuum gripper, for example, in manufacturing plants or industrial or other specific applications.

Since, particularly in industrial applications, the second component may wear more quickly than the first component, the second component may preferably be exchangeably attached to the first component.

The suction cup according to the invention advantageously has, in comparison to common solutions, a considerably improved attachment to rough, structured, and/or bent surfaces as well as on moist surfaces and surfaces in wet areas. Through the combination of various first and second components, an adjustment/optimization to different requirements regarding various substrate surfaces may be possible. Advantageously, the suction cup of the invention attaches efficiently to bent surfaces.

The invention presented here is another biomimetic implementation of the principle of the clingfish suction cup, providing an extremely good sealing on rough and/or bent surfaces while taking advantage of improved friction.

The suction device of the invention attaches to substrate surfaces such as technical surfaces as well as natural surfaces, for example rocks or even some creatures or stones or minerals.

The substrate should be impermeable to fluids.

The solution according to the invention enables for example the attachment of technical elements to submerged substrate surfaces, e.g. on ship hulls, in swimming pools, in ponds, in rivers, or even on aquatic animals, in order to, for example, tag them.

Moreover, technical applications in industry are possible. For example, the solution of the invention may be utilized as a vacuum gripper in manufacturing or production lines or other areas of application.

Another advantage is that the vacuum gripper according to the invention creates improved sealing on structured substrate surfaces, leading to reduced loss of low pressure. Thereby, energy is saved, which otherwise would be needed to renew the low pressure. Thereby, it is possible to provide an environmentally friendly, energy-saving vacuum gripper.

Moreover, various possibilities arise in household and craftsmen or handymen applications. Particularly interesting is, for example, the application of the suction cup according to the invention on uneven tiles in bathrooms and kitchens or for the connection of construction components, whose surfaces must not be damaged.

BRIEF DESCRIPTION OF THE DRAWINGS

The invention will be described in the following by examples and corresponding figures, without being reduced to these.

Wherein is shown.

DETAILED DESCRIPTION OF THE PREFERRED EMBODIMENTS

Figure 1:
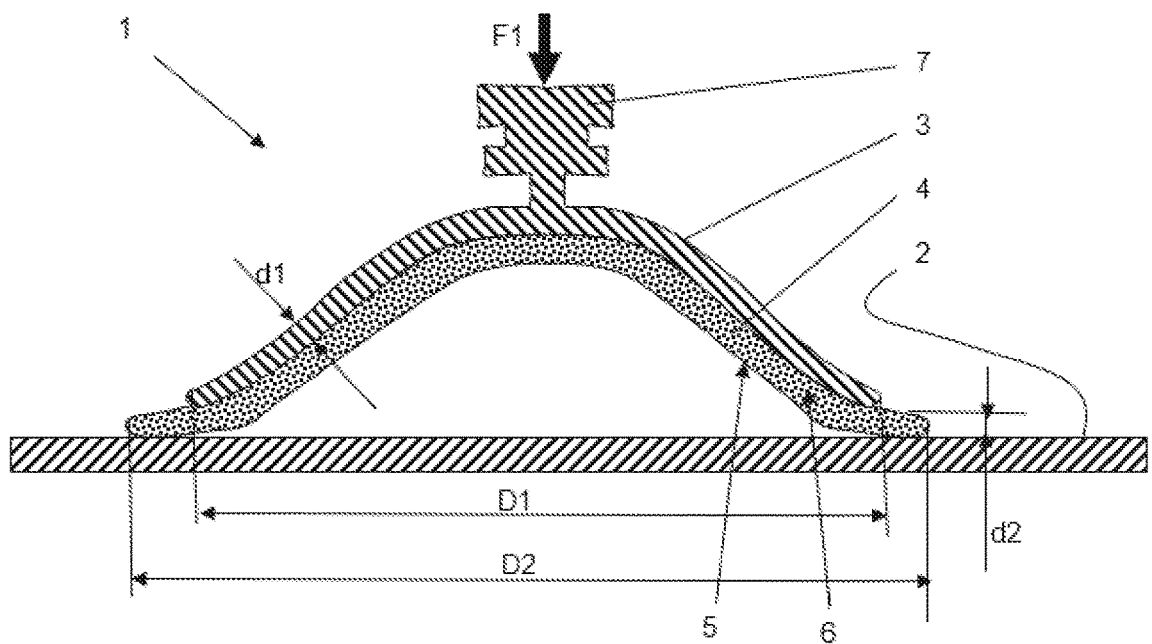
FIG. 1: a cross-section of an exemplary embodiment of the suction cup according to the invention which rests on a substrate surface

In FIG. 1 a cross-section of an exemplary embodiment of the suction cup 1 according to the invention, which rests on a substrate surface 2, is shown. The suction cup 1 comprises a first component 3 with a thickness d1 and a second component 4 with a thickness d2. The first component 3 is made of a first material. The second component 4 is made of a second material, which is considerably softer than the material of the first component 3. The second component 4 is detachably or non-detachably connected to the first component 3 or formed in one piece. Both the first component 3 and the second component 4 extend over the whole area. The outer diameter D1 of the first component 3 is smaller than the outer diameter D2 of the second component 4.

The suction cup surface 5 comes into contact with the substrate surface 2 while applying the suction cup 1 to the substrate surface 2 of any substrate or component/item.

Particles 6 are embedded in the second material of the second component 4. When contact pressure is exerted toward the substrate surface 2, for example by the pressing of the grip or connection element 7 of the suction cup 1 onto the substrate surface 2 or by the subsequent restoring force of the first component 3, those particles are pressed with the comparably soft second component 4 into the suction cup surface 5 and with this into the substrate surface 2, where the particles 6 may arrange themselves fully or partly in the indentations of the substrate surface 2, causing increased friction between the suction cup surface 5 and the substrate surface 2 (see FIG. 3).

By pressing the second component 4 toward the substrate surface 2, the fluid in the cavity between the suction cup 1 and the substrate surface 2 is at least partly pressed out and a lower pressure compared to the ambient pressure is generated, whereby, after releasing the pressing force F1 on the first component 3 of the suction cup, the suction cup 1 attaches to the substrate surface 2. This functions in fluids in the form of gaseous media (e.g. air) and liquid media (e.g. water).

A non-limited, exemplary embodiment is a suction cup 1 with a diameter (equating the outer diameter D1 of the first component 3) of 50 mm to 70 mm, preferably 65 mm, whose second component 4 has a thickness of 1 mm to 5 mm, preferably 2 mm to 3 mm. The first material of the first component 3 has a Shore A hardness of 60 to 80 and a complex modulus (G*) of 10 to 50 MPa, while the second material of the second component 4 has a Shore 00 hardness between 10 and 30 (<5 Shore A) and a complex modulus (G*) of 0.025 MPa.

Such an exemplary suction cup can attach very well to a substrate surface 2 with a coarse surface roughness, such as substrate surfaces with Rt (peak-to-valley height) up to 1 mm to 2 mm and larger or a grain size of 1 mm to 2 mm or a variation of 1 mm to 2 mm in the structural heights of the substrate surface 2. Such a suction cup 1 may also effectively attach to a substrate surface 2 with a radius of curvature of 2.5 to 4 cm or less or more. In order to attach, the suction cup 1 is pressed toward the substrate surface 2 with a pressing force F1 (see FIG. 1). Since the suction cup 1 is convexly arched on the outside, the cavity, which is created between the suction cup surface 5 and the substrate surface 2 of the substrate, is reduced by pressing down, and a lower pressure in comparison to the ambient pressure is generated.

Figure 2:
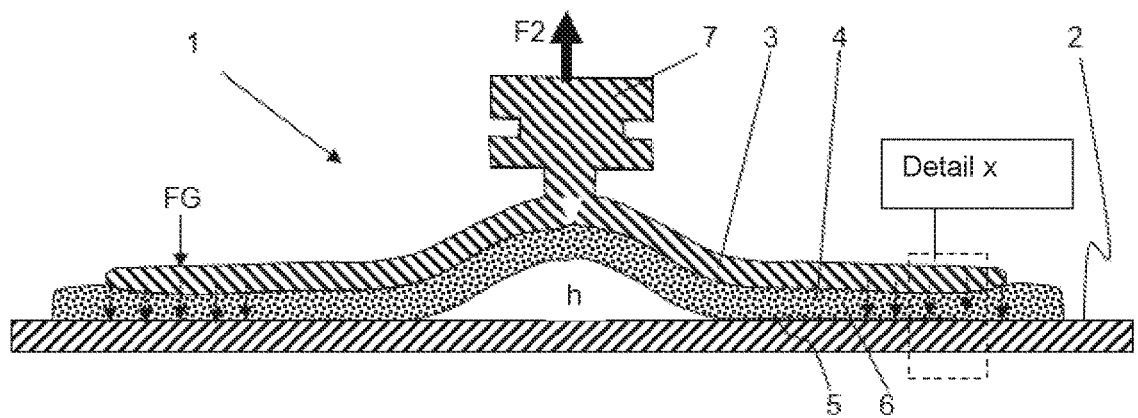
FIG. 2: a cross-section of the exemplary embodiment according to FIG. 1 which is attached to the substrate surface

FIG. 2 illustrates a cross-section of the said embodiment of the suction cup 1 of the invention (according to FIG. 1) which was pressed onto the substrate surface 2 and attaches to it. The elastic first component 3 creates a force to restore it to its original shape according to FIG. 1, by which a lower pressure in the cavity h between the substrate surface 2 and the second component 4 is generated, by which the attachment is created.

It can be recognized that both the first component 3 and the second component 4 comply elastically, and the suction cup 1 with the suction cup surface 5 is pressed onto the substrate surface 2, and the second component 4 with its broad margin has adapted to the substrate surface 2. The particles 6 integrated into the second component 4 are much harder than the material of the second component 4 and are pressed through the comparably soft second component 4 toward the substrate surface 2, where they are at least partly forced into the recesses and/or indentations of the substrate surface 2 (see FIG. 3) and thereby cause an increased friction.

If a pull-off force F2 on the grip or connection element 7 is applied vertically to the substrate surface 2, the margin of the first component 3 is more strongly pressed by its restoring force (and by the consequentially increasing lower pressure) toward the substrate surface 2 with a counterforce FG, thereby increasing the friction between the suction cup surface 5 and the substrate surface 2. Not until the force F2 is large enough to exceed the friction force between the suction cup surface 5 and the substrate surface 2 does the suction cup 1 detach from the substrate surface 2.

Moreover, it is possible to detach the suction cup by at least partly lifting its margin so that a pressure equalization with the ambient pressure can occur.

Figure 3:
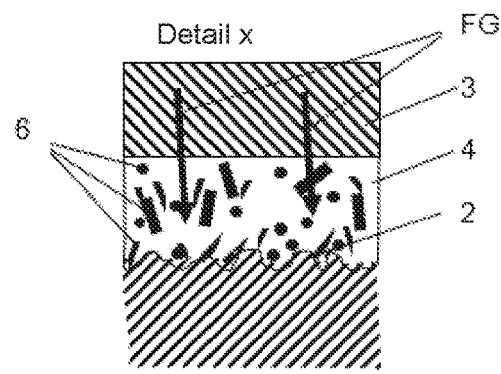
FIG. 3: detail X according to FIG. 2

The magnified detail in FIG. 3 illustrates how particles 6 are pressed into the indentations of substrate surface 2, whereby the friction between the substrate surface 2 and a non-specified suction cup surface at the second component 4, which is located under the first component 3, is increased.

In suction lifters, after placing the suction cup on the substrate, the center of the first component 3 is raised, whereby the lower pressure is generated and the suction cup attaches to the substrate.

Figure 4:
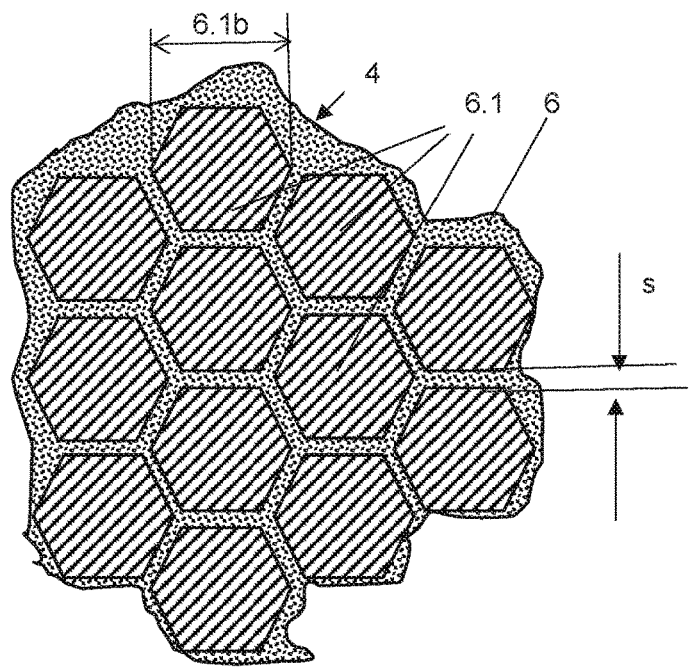
FIG. 4: a cross-section of column-like, embedded structures
Figure 5:
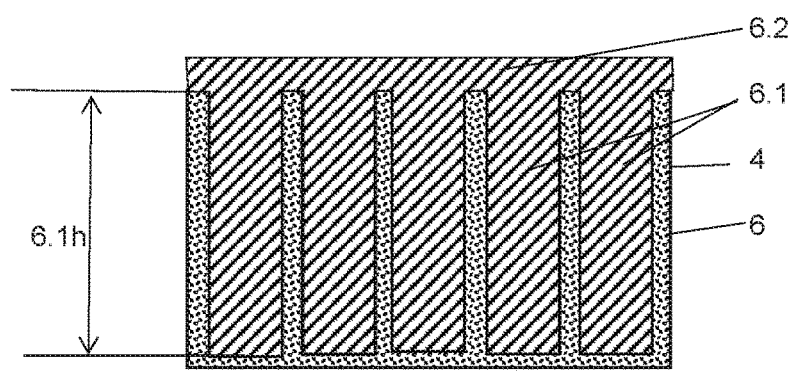
FIG. 5: a longitudinal cross-section of column-like, embedded structures in an unloaded condition

FIG. 4 illustrates an exemplary cross-section and FIG. 5 a longitudinal cross-section of the columns 6.1, embedded in the second material of the second component 4, that are hexagonally shaped and arranged like honeycombs. The largest distance in the cross-section of the columns 6.1b (the diameter in a circular cross-section) measures 0.1 mm to 5 mm. The distance between the columns 6.1 preferably measures between 0.1 mm and 0.5 mm. The height of the columns 6.1h preferably measures between 0.1 mm and 0.5 mm.

The dimensions of the columns 6.1 and their interspaces may be chosen given the dimensions of the suction cup, particularly the thickness of the second component, and may be larger for large diameters and/or thicknesses of the second component 4.

Figure 6:
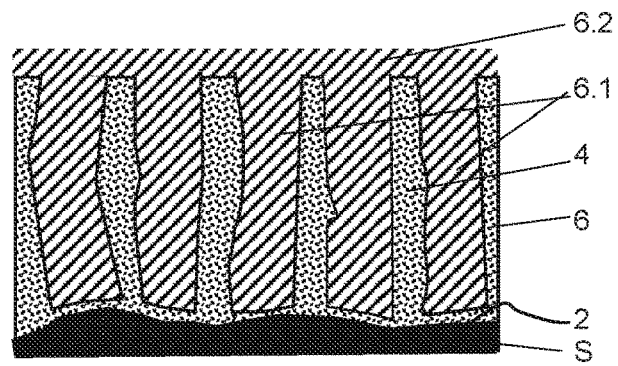
FIG. 6: a longitudinal cross-section of column-like, embedded structures in a loaded condition

Additionally, particles 6 may be embedded in the material of the second component 4. The longitudinal cross-section of the embedded column-like structures or columns 6.1 in a loaded condition in accordance with FIGS. 4 and 5 is illustrated in FIG. 6. Their height 6.1h particularly measures 0.2 mm to 4 mm. The columns, here in combination with the embedded particles 6, lead to improved stability and friction properties of the second component 4 and simultaneously ensure extremely good adaptation to the strong surface irregularities of the substrate S shown in FIG. 6. The extremely soft, surrounding material enables a certain movability of the columns 6.1 toward the support/substrate S while simultaneously ensuring the sealing to the sides of the suction cup and to the substrate S. In FIGS. 5 and 6 it is evident that, at the side opposite the substrate, the columns 6.1 are connected by a supporting layer and are preferably shaped as one piece.

Figure 7:
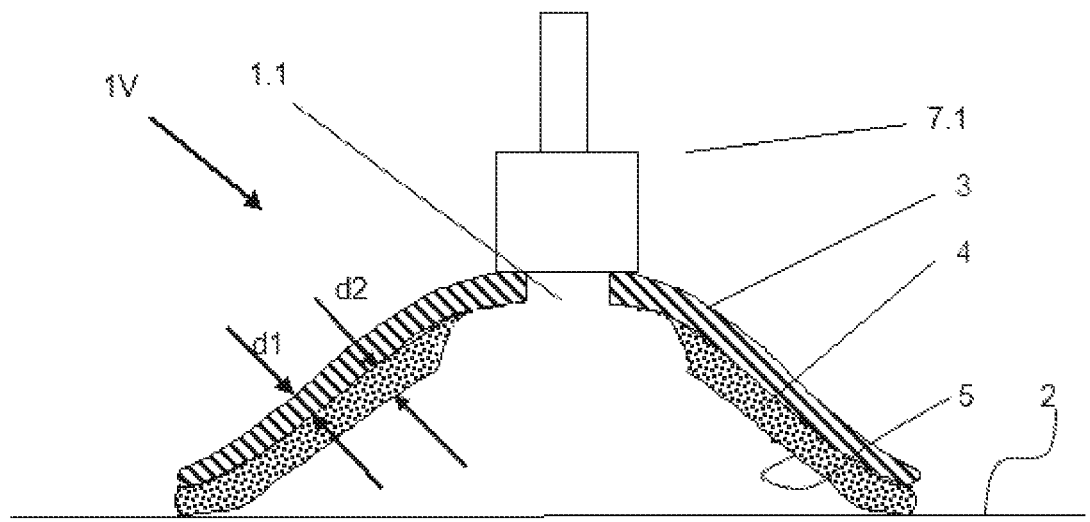
FIG. 7: a cross-section of another exemplary embodiment of the solution according to the invention with a vacuum connection

In FIG. 7 a cross-section of another embodiment of the solution according to the invention in the form of a vacuum gripper 1V, which was loosely placed on a substrate surface 2 and comprises a vacuum connection 7.1, is illustrated. In this embodiment, the second component 4 does not extend over the whole area but is shaped like an O-ring. In this version, it does not extend over the circumferential margin of the first component 3, which, however, would also be possible.

In both cases an optimal sealing at the contact area between the substrate surface 2, at which the suction cup 1 shall be attached, and the second component 4 is ensured. The suction cup 1 has a perforation 1.1 in the area of the vacuum connection 7.1 so that air may be evacuated or supplied. The first component 3 has a thickness d1 and the second component 4 a thickness d2. The thickness d2 of the second component 4 is just slightly larger here than the thickness d1 of the first component 3.

After the vacuum gripper 1V is placed on the substrate surface 2, air is sucked out of the cavity between the substrate surface 2 and the suction cup surface 5; thereby the vacuum gripper 1V with its suction cup surface 5 is sucked or pressed onto the substrate surface 2 and firmly attaches to it (not illustrated). For detachment, air is brought in again via the vacuum connection 7.1, and thereby the attachment between the suction cup surface 5 and the substrate surface 2 is released.

Figure 8:
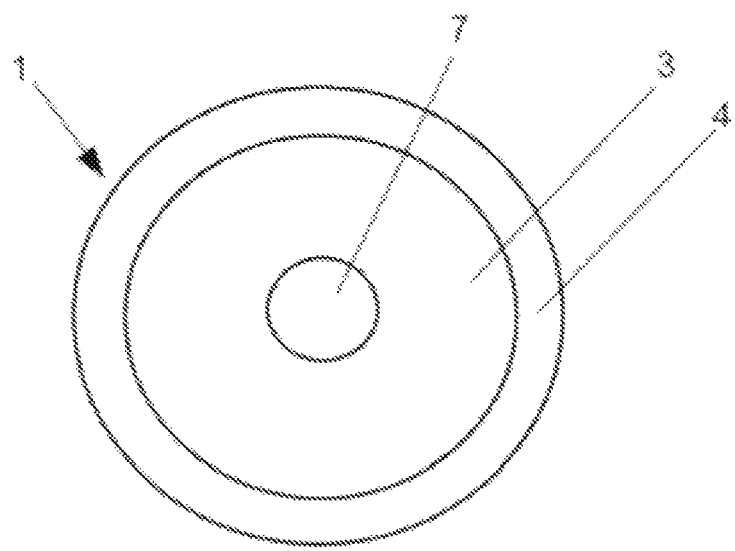
FIG. 8: a top view of an exemplary embodiment of the suction cup according to the invention with the first component extending over the whole area
Figure 9:
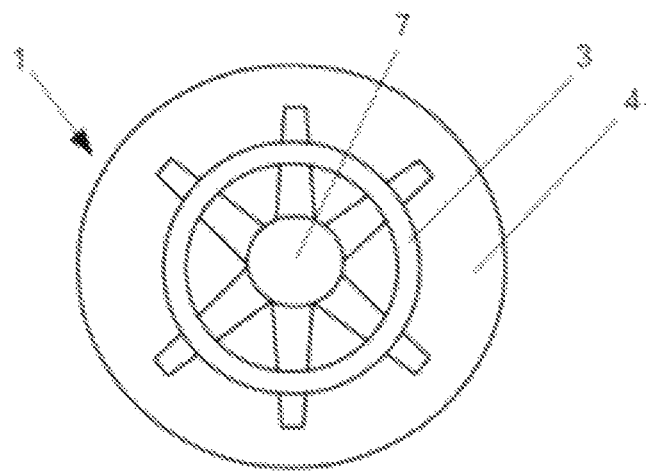
FIG. 9: a top view of another exemplary embodiment of the suction cup according to the invention with a grid-shaped first component
Figure 10:
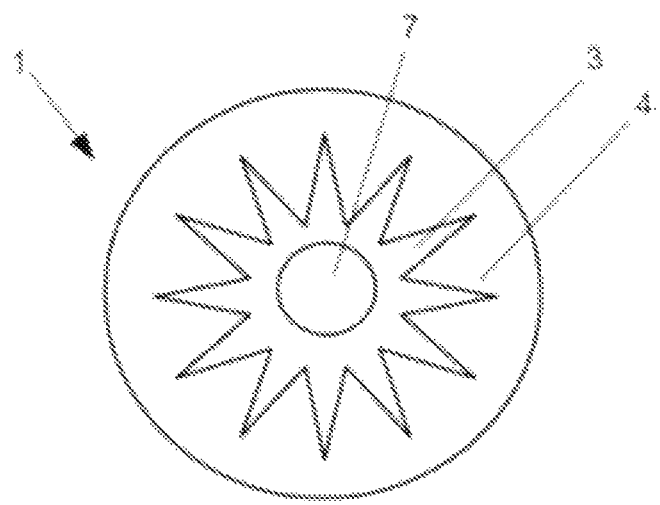
FIG. 10: a top view of another exemplary embodiment of the suction cup according to the invention with a star-shaped first component

A top view of an embodiment of the suction cup 1 according to the invention with a first component 3 extending over the whole area is illustrated in FIG. 8. Moreover, it is possible that, between the grip or connection element 7 and the margin of the suction cup 1, the first component 3 is grid-shaped, as shown in FIG. 9, or star-shaped, as shown in FIG. 10.

Figure 11:
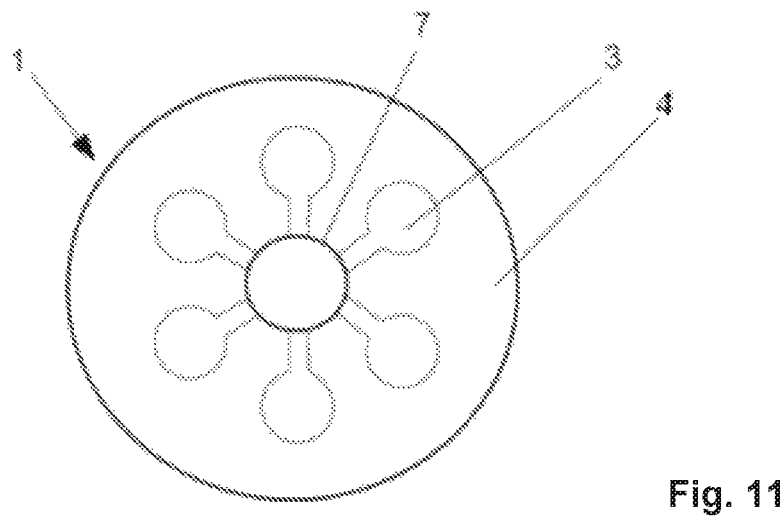
FIG. 11: a top view of another exemplary embodiment of the suction cup according to the invention with an alternatively shaped first component

Other shapes of the first component 3, as exemplarily illustrated in FIG. 11, are also conceivable as long as they ensure a regular transfer of contact pressure on the second component 4.

Figure 12:
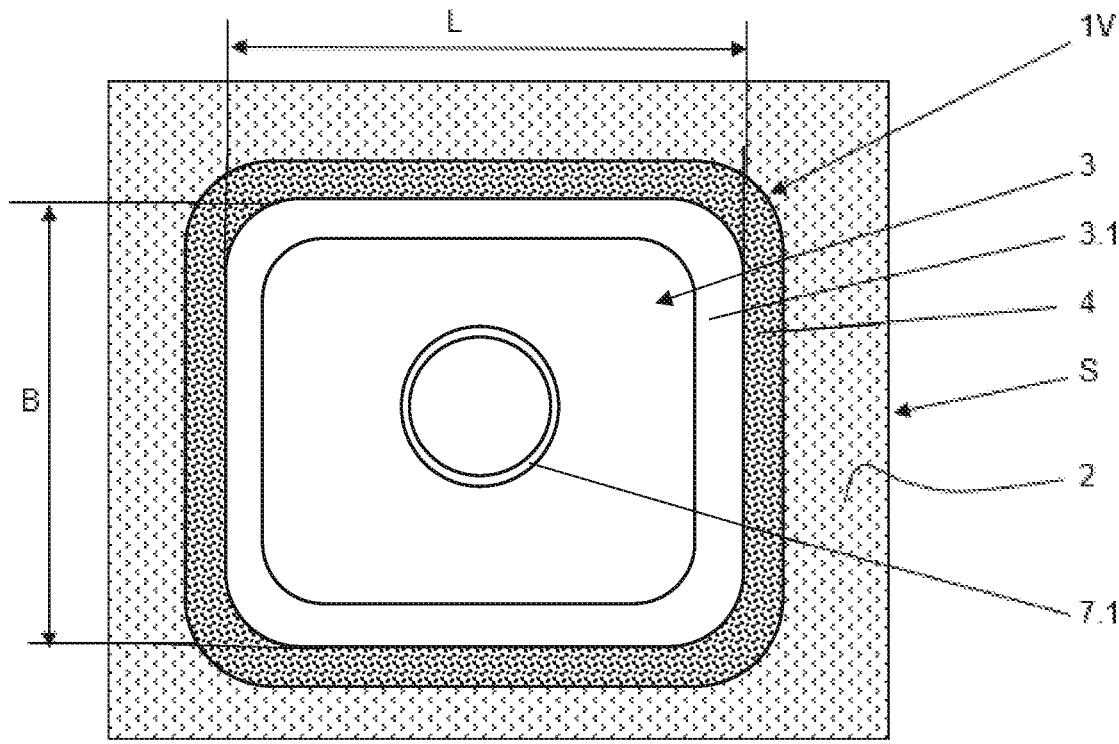
FIG. 12: a top view of a schematic diagram of a vacuum exhauster with the first component made of a hard material such as steel or aluminum
Figure 13:
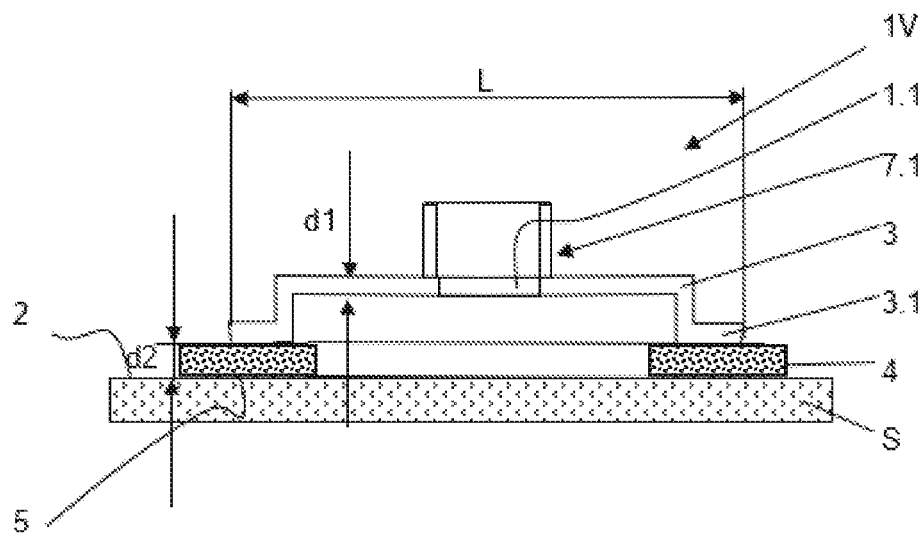
FIG. 13: vacuum exhauster according to FIG. 9 as a schematic diagram in cross-section

In FIGS. 12 and 13 a vacuum gripper for industrial application is shown, which in top view essentially has a quadrangular basic shape with a length L and a width B. The first component 3 is essentially designed to be stiff and casinglike with a reduced thickness d1 and possesses, toward the second component 4, a flange 3.1 pointing outward. The first component 3 may, for example, be made of metal, such as steel or aluminum, or of a stiff plastic or of a combination of the said materials. Below the flange 3.1 is the second component 4, which is formed as a circumferential band following the profile of the flange 3.1 and which has a thickness d2.

In the illustrated embodiment, the second component 4 extends inwardly and outwardly beyond the flange 3.1. According to one non-illustrated variation, the second component 4 may also only extend inwardly or outwardly beyond the flange 3.1 or may also terminate at it.

The second component 4 also contains particles 6 and/or fibers (which are not identified here) and rests via its suction cup surface 5 on the substrate surface 2 of a substrate S. The first component 3 has a perforation 1.1, followed by a connection 7.1 to a, non-illustrated, vacuum hose, which is connected to a vacuum pump. When the suction cup surface 5 rests on the substrate surface 2, air is sucked out of the cavity between the vacuum gripper 1V and the substrate surface 2 by a vacuum pump, whereby a lower pressure in comparison to the ambient pressure is generated, and the vacuum gripper 1V with its second component 4, on which the flange 3.1 of the first component 3 acts, is pressed onto the substrate surface 2.

Now, the substrate S, which is attached to the vacuum gripper 1V, can be lifted by means of the vacuum gripper 1V (at which one or more, non-illustrated, handling elements may also be provided) and in accordance with the construction or manufacturing task can be moved and released again. Then, the vacuum gripper 1V (or vacuum bell) is removed from the substrate surface 2 by equalizing the pressure in the cavity with the ambient pressure or by applying a slightly higher pressure.

The second component 4 is preferably detachably and air-tightly connected with the first component 3, and, therefore, in the case of deterioration or use on a different substrate surface, it may be exchanged.

The thickness d2 of the second component 4 of a suction device should, in an unloaded condition, measure more than 2.5%, preferably 3 to 8%, and especially preferably 3.5 to 7% of the largest dimension of the first component 3 that extends in the plane of the substrate surface 2 (i.e. the outer diameter D1, a length L, or a width B, depending on the design). In vacuum grippers, which have a very large diameter or a very large length or width and in which the contact pressure on the second component is generated by vacuum and not by the restoring force of the first component, the thickness d2 of the second component may measure less than 2.5% of D1, L, or B.

According to a non-illustrated embodiment, the particles/fibers and/or the column-like structures in the second layer of the second component 4 may not be distributed over the whole cross-section of the second component 4, but rather they may be located in the material of the second component only close to the suction cup surface 5. Moreover, according to a non-illustrated embodiment, it is possible to realize the second component 4 without the particles/fibers and/or the column-like structures and cover it with a very thin, but also elastic, very soft layer which contains the particles/fibers and/or the column-like structures. Moreover, it is possible to arrange the particles/fibers and/or the column-like structures in different regions of the second, extremely soft component 4.

Figure 14:
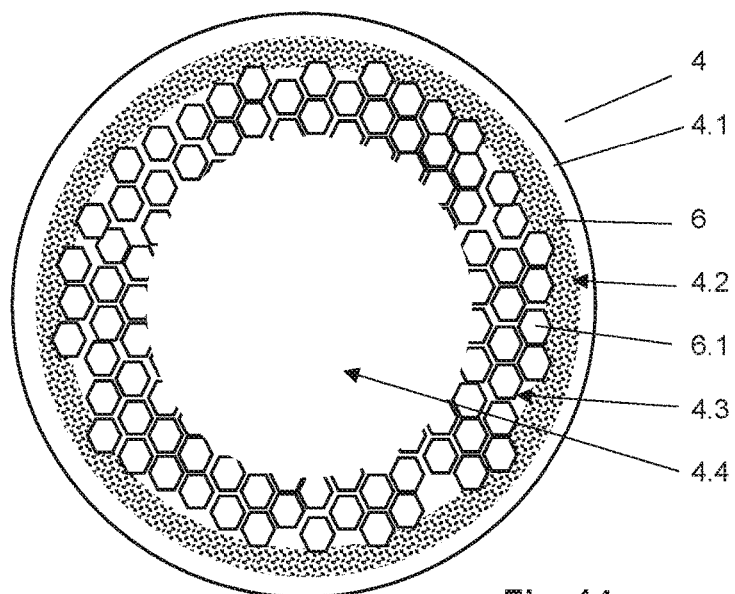
FIG. 14: a bottom view of an alternative embodiment of the second component of the suction cup

This is exemplarily illustrated in FIG. 14. In the second component 4 is a first annular region 4.1 without particles, and radially inward from this extends a second annular region 4.2 with particles 6, and radially inward from that extends a third annular region 4.3 with columns 6.1. In the remaining inner region 4.4 no particles 6 or columns 6.1 are integrated. The order of these regions can also change. Moreover, in accordance with a non-illustrated embodiment, an annular region with larger particles and an annular region with smaller particles may be combined, and, optionally, an annular region with some column-like structures may be included as well.

Figure 15:
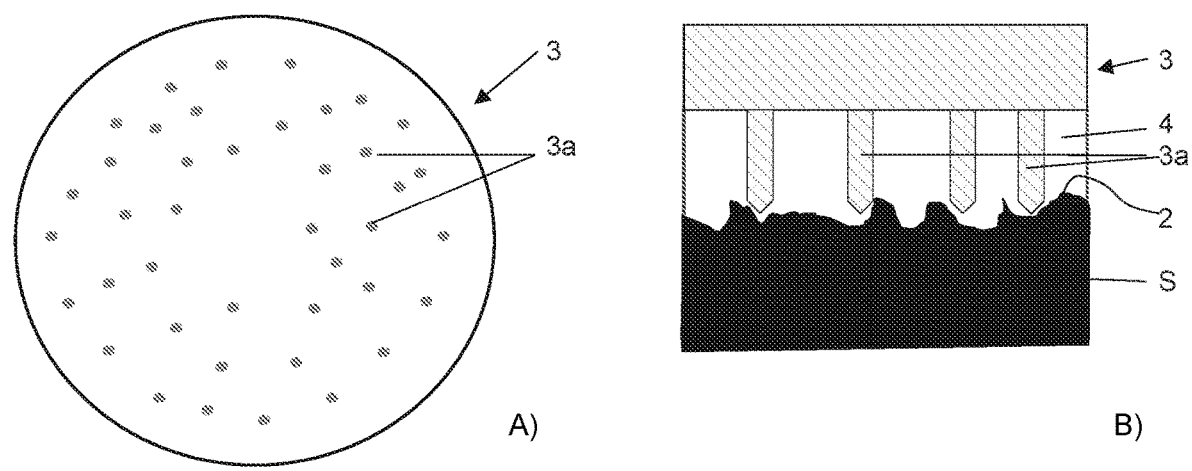
FIG. 15: A) a bottom view of the second component with projections/structures; B) projections/structures arising from the first component are pressed under contact pressure into the second component and the roughness profile of the substrate surface

According to FIG. 15, improved friction may also be achieved by projections/structures 3a protruding from the first component 3 and reaching into the second component 4. When a contact pressure is applied toward the substrate surface 2, the said, for example point-shaped, projections of the first component 3 are pressed into the indentations of the surface structure of the substrate surface 2 and increase friction.

FIG. 15 illustrates in drawing a) a bottom view of the first component 3 with projections 3a and in drawing b) the projections/structures 3a in the first component 3, which under a contact pressure, are pressed into the second component 4 and into the roughness profile of the substrate surface 2.

Wherein, it is important that the said projections 3a do not completely penetrate the second component 4 toward the substrate S but that they are only strongly pressed into the latter.

The suction cup according to the invention may be applied on very rough surfaces such as metal ridge stock (whose surface may have structures with a height up to 2 mm) and can also be applied underwater. Metal ridge stock is sheet metal with a diagonally-ribbed structure.

Figure 16:
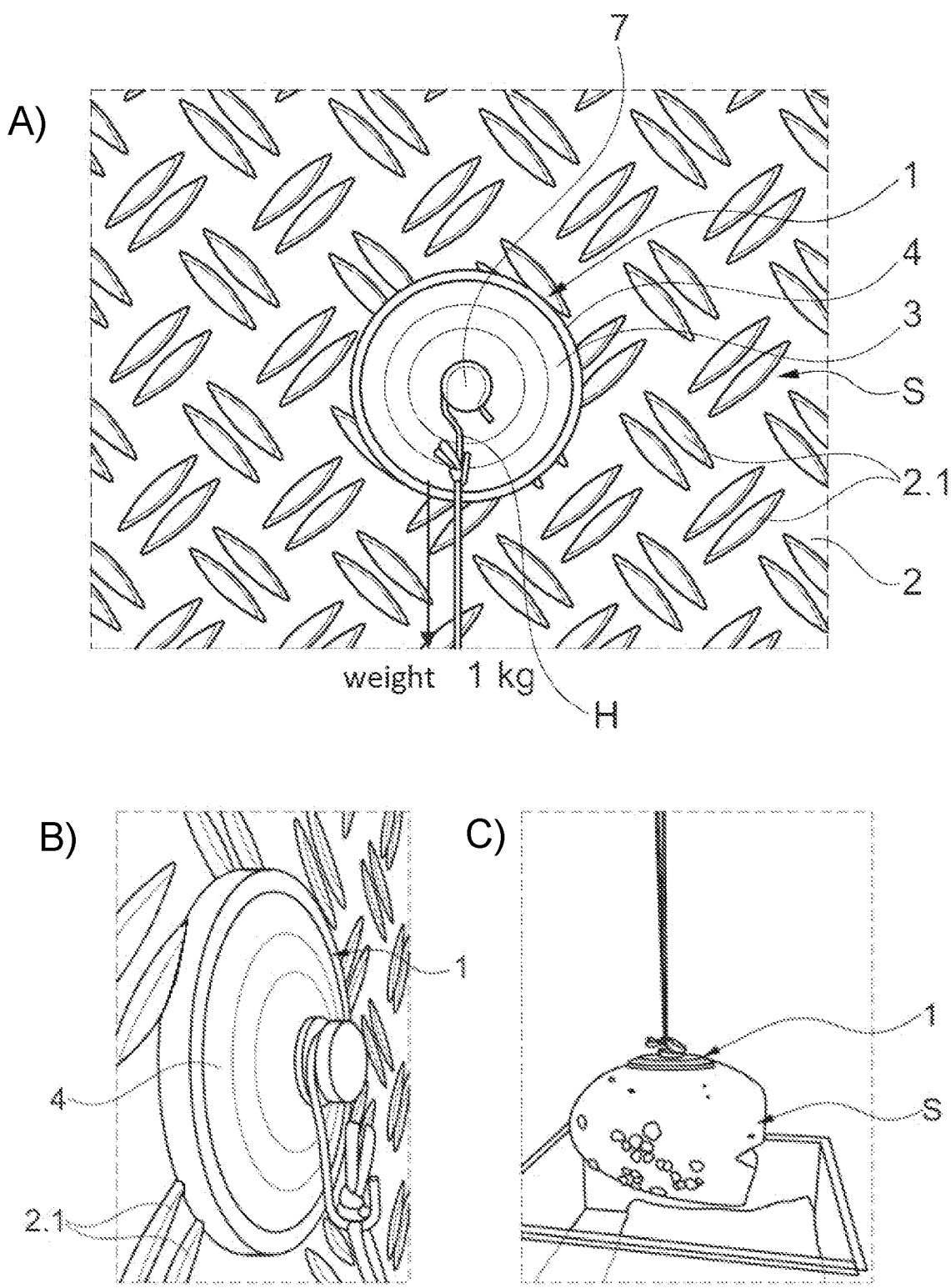
FIG. 16: attachment variations of the suction cup: A) and B) suction cup attached to a metal ridge stock; C) suction cup holding a stone of approximately 1 kg

In FIG. 16 the attachment of the suction cup 1 is illustrated; in a) and b) the substrate S is a metal ridge stock, and in c) the substrate S is a stone. The metal ridge stock as the substrate S possesses projections, arranged in a staggered way 2.1, at the substrate surface 2 with a structural height of 1.2 mm, and the stone as the substrate S possesses a roughness/structure of 1 mm to 2 mm with superimposed waviness and coarse shape variation. By pressing down the suction cup 1, the extremely soft second component 4 adjusts to the substrate surface 2 and encloses the ridges 2.1, which is particularly recognizable in drawing b), so that a lower pressure can develop and the suction cup 1 attaches to the substrate S. The suction cup 1 was loaded with 0.8 kg by means of a hook H connected to a grip or connection element 7. According to drawing c) a substrate S attached to the suction cup 1 is a stone with a weight of approximately 1 kg.

There is a clear connection between the thickness of the second component 4 and the maximal roughness or structuring of the substrate surface 2, to which the suction cup can attach. In the specific embodiment of a suction cup according to FIG. 1 with a diameter D1=60 mm, the optimal thickness of the second component 4 is 2.5 mm to 5 mm, 4% to 8% of the diameter D1 respectively (see table 1).

TABLE 1

Relationship between the thickness d1 of the second component 4 and attachment to substrates with increasing roughness.

| Second component 4 | | Substrate (grain size in mm) | | | | | | |
|---|---|---|---|---|---|---|---|---|
| Thickness d2: | | A1 | A2 | A3 | A4 | A5 | A6 | A7 |
| mm | % | 0 mm | 0.1 mm | 0.2 mm | 0.5 mm | 1-2 mm | 1.5-2.5 | 2-6 mm |
| 1 | 1.7 | x | x | x | — | — | — | — |
| 1.5 | 2.5 | x | x | x | — | — | — | — |
| 2 | 3.3 | x | x | x | (x) | (x) | — | — |
| 2.5 | 4.2 | x | x | x | x | x | — | — |
| 3 | 5 | x | x | x | x | x | x | — |
| 4 | 6.7 | x | x | x | (x) | x | x | (x) |
| 5 | 8.3 | x | x | x | x | x | x | (x) |
| 6 | 10 | x | x | (x) | (x) | — | — | — | x attaches,
(x) attaches but not reliably,
— does not attach

Increasing the thickness of the second component 4 increases the tolerated roughness proportionally. Consequently, an extremely soft second component 4 with a low thickness only enables attachment to slightly rough surfaces (up to grain size 200 μm). On very rough surfaces, suction cups with too small of a thickness of the second component 4 fail. A minimum thickness of 2.5 mm (4.2% of the suction cup diameter D1) enables, in the said embodiment, a reliable attachment to very rough surfaces (A4-A7).

Figure 17:
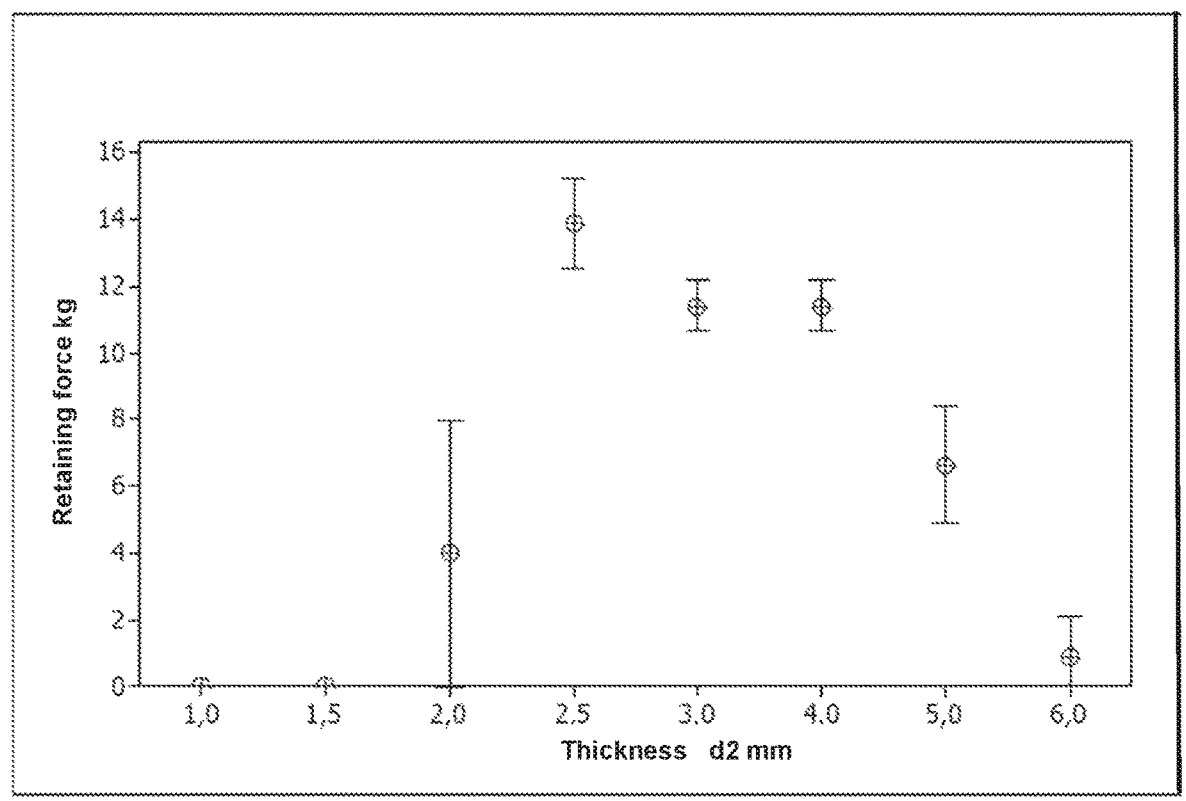
FIG. 17: a diagram illustrating the relationship between the pull-off force in kg and the thickness of the second component in mm

FIG. 17 illustrates the pull-off force of the said embodiment with an increasing thickness d2 of the second component 4 on a very rough substrate of 1 mm to 2 mm grain size. While suction cups with a thickness d2 of the second component smaller than 2 mm do not attach, a reliable attachment with attachment forces up to 14 kg (normal force, 14 kg equals 137 N) is gained for a thickness of the second component of 2.5 mm to 4 mm (4.2% to 6.7% of the suction cup diameter D1). FIG. 17 shows the relationship between the pull-off force of a suction cup in kg versus the thickness d2 of the second component 4 of the suction cup in mm.

It is possible to determine the optimal configuration of a suction cup that is most applicable for a substrate surface by means of pretests.

LIST OF REFERENCE NUMERALS

1 Suction cup
1V Vacuum gripper
1.1 Perforation
2 Substrate surface
2.1 Ridge
3 First component
3.1 Flange
3a Projection/structure
4 Second component
4.1 First annular region
4.2 Second annular region
4.3 Third annular region
4.4 Inner region
5 Suction cup surface
6 Particle
6.1 Columns
6.1b Widest region
6.1h Height
7 Grip or connection element
7.1 Vacuum connection
B Width
D1 Outer diameter of the first component
D2 Outer diameter of the second component
d1 Thickness of the first component
d2 Thickness of the second component
F1 Pressing force
F2 Pull-off force
FG Counterforce
h Cavity
H Hook
L Length
S Substrate

The invention claimed is:

1. A suction device, in particular a suction cup (1), suction lifter, or vacuum gripper (1V), for reversible attachment to a substrate surface (2), comprising a first component (3), which is used for an actuation of the suction device, and a second component (4), which can be brought into contact with the substrate surface (2) via a suction cup surface (5), wherein the first component (3) is made of at least one harder first material and the second component (4) of at least one, in comparison to the first material, softer second material, wherein the second material is a soft material with a Shore 00 hardness less than 50, and
that a thickness (d2) of the second component measures, in an unloaded condition, at least 2.5% of an outer diameter (D1) or a length (L) or a width (B) of the first component (3) and/or
that particles (6) and/or fibers, which are harder than the second material, are integrated into at least one second material.

2. The suction device according to claim 1, wherein the said softer second material of the second component (4) has a Shore 00 hardness less than or equal to 35.

3. The suction device according to claim 1, wherein the said second component (4) extends inward from a circumferential margin over at least 55% of a total area of the first component (3) and toward the substrate surface (2).

4. The suction device according to claim 1, wherein the said second component (4) extends over at least 65% of a total area of the first component (3).

5. The suction device according to claim 1, wherein the said second component (4) extends over at least 75% of a total area of the first component (3).

6. The suction device according to claim 1, wherein the said softer second material of the second component (4) has a thickness of 3% to 8% of an outer diameter (D1) or a length (L) or a width (B) of the first component (3).

7. The suction device according to claim 1, wherein the said softer second material of the second component (4) has a thickness of 3.5% to 7% of an outer diameter (D1) or a length (L) or a width (B) of the first component (3).

8. The suction device according to claim 1, wherein the first component (3) has an outer diameter (D1), and the second component (4) has a comparably larger outer diameter (D2).

9. The suction device according to claim 1, wherein at least one second material of the second component (4) consists of at least one polymer and/or at least one elastomer or a combination of one or more polymers and/or elastomers.

10. The suction device according to claim 1, wherein columns with an annular or angular cross-section are embedded in the second component (4) and consist of an elastic material, which is harder than said softer second material of the second component.

11. The suction device according to claim 1, wherein projections and/or a structure (3a) protrude out of the first component (3), reach into the second component (4) and, while a contact pressure is exerted, are pressed into the second component (4) and the substrate surface (2).

12. The suction device according to claim 1, wherein particles (6) and/or said fibers and/or columns, which are integrated into the material of the second component (4), can be at least partly pressed into the indentations of a surface profile of the substrate surface (2).

13. The suction device according to claim 1, wherein at least one second material of the second component (4) is a swellable material and/or the second material contains swellable particles and/or the second component (4) is coated with a swellable material on the suction cup surface (5).

14. The suction device according to claim 1, wherein the suction cup (1) contains a grip or connection element (7) and/or the vacuum gripper (1V) contains a connection for a vacuum pump, whereby a vacuum between the suction cup (1) or the vacuum gripper (1V) and the substrate surface (2) can be generated.

15. The suction device according to claim 1, wherein the first component (3) of the suction device in the form of the vacuum gripper (1V) or the suction lifter is made of a very hard material.

* * * * *